United States Patent
Kottke et al.

(10) Patent No.: US 8,204,163 B2
(45) Date of Patent: Jun. 19, 2012

(54) PROCESS FOR RECEIVING A BROADBAND ELECTROMAGNETIC SIGNAL

(75) Inventors: Thomas Kottke, Ehningen (DE); Karl Trottler, Langenargen (DE)

(73) Assignee: EADS Deutschland GmbH, Ottobrunn (DE)

(*) Notice: Subject to any disclaimer, the term of this patent is extended or adjusted under 35 U.S.C. 154(b) by 801 days.

(21) Appl. No.: 12/350,554

(22) Filed: Jan. 8, 2009

(65) Prior Publication Data

US 2009/0175382 A1 Jul. 9, 2009

(30) Foreign Application Priority Data

Jan. 9, 2008 (DE) .......................... 10 2008 003669

(51) Int. Cl.
*H04B 1/10* (2006.01)
(52) U.S. Cl. ....................................................... 375/349
(58) Field of Classification Search ............ 375/240.18, 375/259, 316, 324, 349; 342/196; 379/406.13, 379/387.02; 370/210; 708/404, 405; 324/607; 341/126, 127, 128, 155, 156, 159
See application file for complete search history.

(56) References Cited

U.S. PATENT DOCUMENTS

| | | | | |
|---|---|---|---|---|
| 5,745,846 A * | 4/1998 | Myer et al. | ..................... | 455/209 |
| 6,931,241 B2 * | 8/2005 | Khlat et al. | ..................... | 455/137 |
| 7,835,457 B2 * | 11/2010 | Friedrich et al. | ............. | 375/261 |
| 2001/0014594 A1 | 8/2001 | Khlat et al. | | |
| 2004/0032354 A1 * | 2/2004 | Knobel et al. | ................ | 341/133 |

* cited by examiner

*Primary Examiner* — Sam K Ahn
(74) *Attorney, Agent, or Firm* — Crowell & Moring LLP

(57) ABSTRACT

In a process for receiving a broadband electromagnetic signal, the receiving spectrum is divided into n partial spectrums (n>1), which are subjected to parallel further processing in n channels. The resulting n partial signals are then demodulated into the base band, digitized by n equal-type analog-to-digital converters, and spectrally transformed by a fast Fourier Transform. Interfering edge effects at the transition to the respectively adjacent channel are compensated by amplitude and phase correction of the n partial signals for compensating. Finally, the partial spectrums of the n partial signals are integrated to form a total spectrum in the frequency domain.

9 Claims, 1 Drawing Sheet

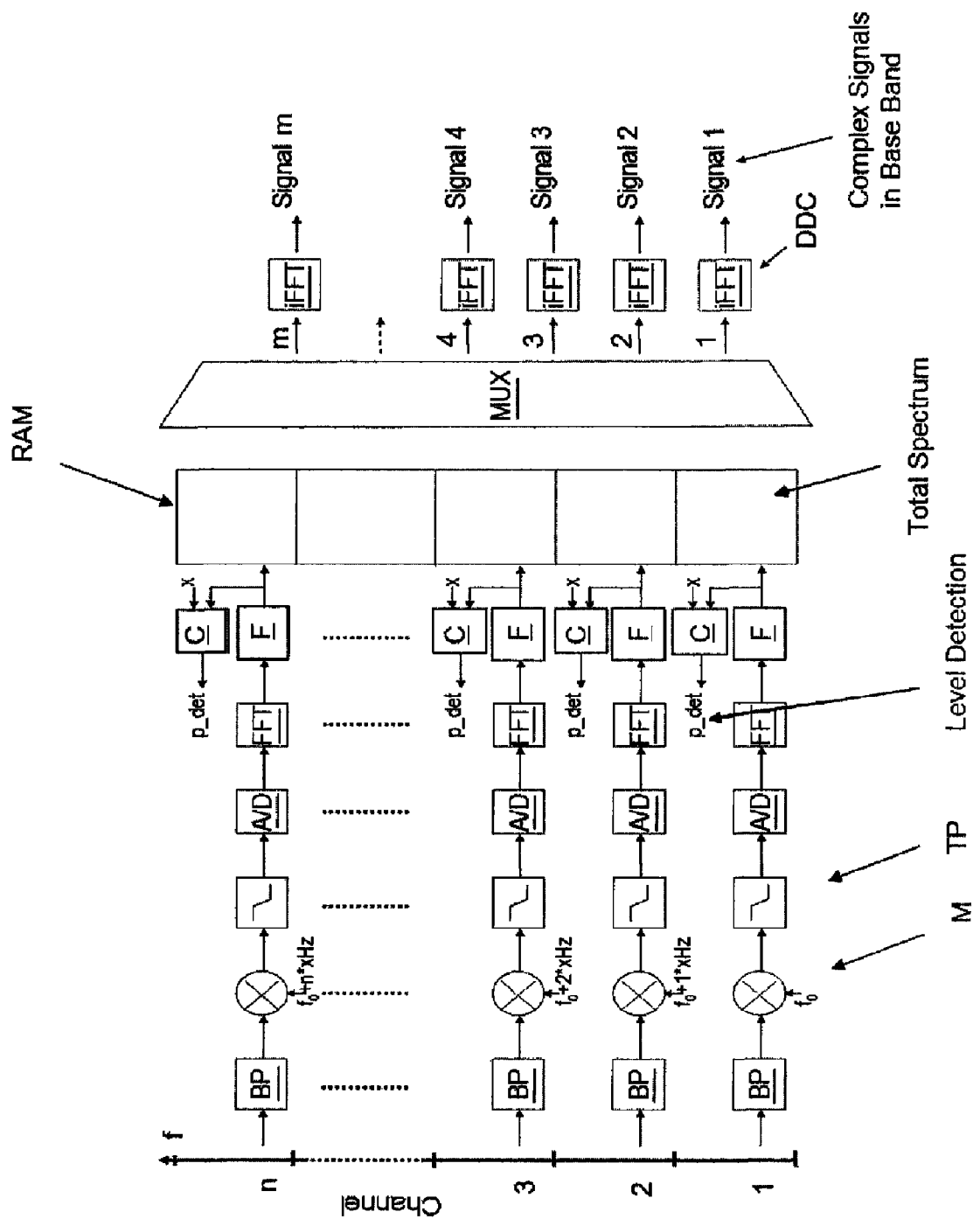

PROCESS FOR RECEIVING A BROADBAND ELECTROMAGNETIC SIGNAL

BACKGROUND AND SUMMARY OF THE INVENTION

This application claims the priority of German patent document 10 2008 003669.2-31, filed Jan. 9, 2008, the disclosure of which is expressly incorporated by reference herein.

The present invention relates to a process for receiving a broadband signal, particularly for the purpose of radio reconnaissance.

Because of the maximum sampling frequency of available analog-to-digital converters, HF receivers have a limited bandwidth. This problem, can be avoided by operating several analog-to-digital converters in a time-shifted manner (time interleaving) and thereby increasing the sampling rate. However, such processes have the disadvantage that the synchronization and the control on a time and level basis of the analog-to-digital converters require high expenditures and the sampling rate or clock frequency of the converted data is very high.

Published U.S. Patent Application 2001/0014594 A1 discloses a process of receiving a broadband electromagnetic signal, which includes the following steps:
- Division of the receiving spectrum into n partial spectrums, with n>1;
- parallel further processing of the thus obtained n partial signals in n channels;
- Demodulation of the n partial signals into the base band;
- analog-to-digital conversion of the n partial signals by means of n equal-type analog-to-digital converters;
- amplitude and phase correction of the n partial signals for compensating interfering edge effects at the transition to the respectively adjacent channel.

One object of the invention to provide a receiving process with a high bandwidth for the purpose of radio reconnaissance, while the required sampling or clock rate of the used components is low.

This and other objects and advantages are achieved by the process according to the invention, in which the bandwidth of the receiver is achieved by decomposing the received signal into several partial spectrums which can then be processed in parallel, rather than by using a higher sampling in the time domain. Subsequently, the partial spectrums are joined to form a total spectrum which describes the total signal.

From the total spectrum, individual frequency bands are extracted, and are supplied, via a multiplexer to parallel subsequent processing channels for further processing. This is particularly important for radio reconnaissance when signals of unknown emitters are detected.

The frequency bands to be extracted from the total spectrum can be selected by comparing the level values with a threshold value, in each individual processing channel.

By means of the invention, it is possible to process the signal analysis in a more parallel manner, while the required processing rate/clock rate is significantly reduced. Likewise, the need for costly time synchronization between the individual analog-to-digital converters is eliminated.

Additional advantages of the invention are the following:
Signals with a very high bandwidth can be sampled.
Data are very parallelized, so that high data rates are not required for the subsequent signal processing or for the storage of the total spectrum in the RAM memory.
The signal is filed in the frequency domain rather than in the time domain. Frequency bands from the total spectrum that are of interest may be further processed by an arbitrary number of digital down converters (DDCs), which are switched in parallel and connected by way of a multiplexer, per an inverse FFT.

Other objects, advantages and novel features of the present invention will become apparent from the following detailed description of the invention when considered in conjunction with the accompanying drawings.

BRIEF DESCRIPTION OF THE DRAWINGS

The FIGURE is a block diagram which illustrates the sequence of process according to the invention.

DETAILED DESCRIPTION OF THE DRAWINGS

Analogous input band-pass filters BP decompose the broadband input signal into n (preferably overlapping) spectral regions, with n generally being greater than 1 (for example, n=2, 3, 4, 5, etc). The individual partial signals are processed in n parallel processing channels.

First, the filtered n partial signals are demodulated into the base band at a mixer M in each processing channel. To eliminate the high-frequency mixed products, advantageously an analog low-pass filter TP may be provided. Subsequently, n equal-type analog-to-digital converters AD in each processing channel carry out an analog-to-digital conversion.

Thereafter, the digital signals are transformed into the frequency domain by an FFT. This is followed by an amplitude and phase correction of the n partial signals in the adaptive digital filters F. It is the goal to correct the edge effects between the spectra of the individual signal processing channels, which may be the result of undesired characteristics in the analog filters. In order to carry out this amplitude and phase correction, the frequency responses of the band pass filters BP and of the low pass filters TP are preferably used, as they occur during a calibration of the circuit by a broadband input signal. A white noise signal or a Dirac-pulse-shaped signal, for example, is suitable for this purpose.

In the next process step, the individual spectrums of the n processing channels are prejoined to form a total spectrum, which can be displayed, for example, on a monitor. According to the invention, because of the parallel processing in the individual processing channels, the clock rate is comparatively low (compared with the conventional serial process).

However, instead of a monitor display, in the embodiment illustrated in the figure, the n complex-value partial spectrums are stored in a random access memory RAM. Because of the parallelism of the processing, the storage of the total spectrum in the RAM memory can take place at a comparatively low clock rate.

The total spectrum is distributed over the entire RAM memory. In a particularly advantageous embodiment, it can be constructed as a 3-dimensional vector space. Dimension (1) represents the frequency; dimension (2) represents the time; and dimension (3) represents the analog-to-digital conversion depth, thus, the signal level. In this case, dimension (1) corresponds to the individual FFT channel values, and dimension (2) corresponds to the time history of the individual FFT channel values.

Individual frequency bands that are of interest are selected and extracted from the total spectrum, and the corresponding signals are then subjected to an inverse FFT (iFFT) at digital down converters DDC. This results in base band data for the selected frequency bands, which can then be fed to a further signal processing, for example, in a classifier, decoder, etc. However, this processing on the output side is not an object of the present invention.

In the illustrated embodiment, the partial spectra are subjected to a signal detection in the n parallel processing channels. In radio reconnaissance, this is useful, for example, when signals of unknown emitters are to be detected.

The individual FFT channel values are compared with a threshold value x in a comparator C, in order to recognize high level values and therefore emitter activities. The reference value may be either fixed or changeable.

The detection bits p_det obtained from the comparison can be analyzed as a vector extending over all n channels. This vector shows where emitting activities are situated and which bandwidths they cover. It consists of the individual p_det, and is formed to extend over all p_det of the individual channels. Thus, emissions which are situated within two signal processing channels can also be detected with their correct bandwidth.

Preferably, specifically those frequency bands in which emitter activities have been detected previously are selected and extracted from the total spectrum, as it is present in the RAM memory RAM. For purposes of clarification, it is pointed out that these selected frequency bands can be distinguished from the partial spectrums as present in the n processing channels.

The detected frequency bands within the total spectrum are each fed to an inverse FFT processing. Advantageously, the detected spectrums are read out from the RAM memory into the iFFT processing by way of a multiplexer MUX which selects the corresponding data from dimension (1) and distributes them onto one of several parallel further processing channels 1 to m. By using the multiplexer, it therefore becomes possible to carry out the iFFT process of the extracted frequency bands in several channels parallel to one another.

The above description illustrates that the number n of the input channels is completely independent of the number m of the further processing channels, and may or may not be equal to m.

At the output of the IFFT processing, IQ base band data are obtained individually for those frequency bands in which signal fractions of the detected high-frequency input signal occur. By filing the data with a time history (dimension 2), the past of the signal can be traced. This will be useful when a further processing step, such as a decoding unit, from the beginning, needs the signal which can be detected only after a certain time.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A process for receiving a broadband electromagnetic signal, comprising:
    dividing the receiving spectrum into n partial spectrums, with n>1;
    parallel further processing of thus obtained n partial signals in n channels;
    demodulating the n partial signals into the base band; n equal-type analog-to-digital converters performing an analog-to-digital conversion of the n partial signals;
    amplitude and phase correcting the n partial signals for compensating interfering edge effects at the transition to the respectively adjacent channel;
    spectral transformation of the n partial signals in the n parallel channels using n Fast Fourier Transforms FFT;
    integration of the partial spectrums of the n partial signals to form a total spectrum in the frequency domain; and
    extraction of individual frequency bands from the total spectrum which, while a multiplexer is used, are in each case fed to one of several parallel further processing channels.

2. The process according to claim 1, wherein the n partial signals are analyzed in the n channels with respect to existing emitter signals.

3. The process according to claim 2, wherein existing emitter signals are analyzed by comparing their level values with a threshold value.

4. The process according to claim 2, wherein a vector is formed from the individual result values of the analysis in the n channels.

5. The process according to claim 4, wherein the frequency bands to be extracted from the total spectrum are selected based on result values from the n channels.

6. The process according to claim 1, wherein, in each of the parallel further processing channels, one of the frequency bands to be extracted is subjected to an inverse FFT processing, whereby IQ signals are generated in the base band.

7. The process according to claim 1, wherein the total spectrum is intermediately stored.

8. The process according to claim 7, wherein the total spectrum is stored in three dimensions which are frequency, time and signal level.

9. The process according to claim 1, wherein the n partial signals are amplitude and phase corrected based on a calibration using one of white noise and a broadband input pulse.

* * * * *